US012682735B2

(12) United States Patent
Winship

(10) Patent No.: US 12,682,735 B2
(45) Date of Patent: Jul. 14, 2026

(54) PIEZOELECTRIC SOUNDER DEVICE

(71) Applicant: Drager Safety AG & Co. KGaA, Lubeck (DE)

(72) Inventor: Mark Winship, Tyne and Wear (GB)

(73) Assignee: Dräger Safety AG & Co. KGaA, Lübeck (DE)

( * ) Notice: Subject to any disclaimer, the term of this patent is extended or adjusted under 35 U.S.C. 154(b) by 30 days.

(21) Appl. No.: 18/609,155

(22) Filed: Mar. 19, 2024

(65) Prior Publication Data

US 2024/0331519 A1 Oct. 3, 2024

(30) Foreign Application Priority Data

Mar. 31, 2023 (EP) .................................... 23165991

(51) Int. Cl.
*G08B 17/06* (2006.01)
*G08B 3/10* (2006.01)

(52) U.S. Cl.
CPC ............... *G08B 17/06* (2013.01); *G08B 3/10* (2013.01)

(58) Field of Classification Search
CPC ........... G08B 17/06; G08B 3/10; G10K 9/122
See application file for complete search history.

(56) References Cited

U.S. PATENT DOCUMENTS 6,650,232 B1 * 11/2003 Strohbeck ................ G08B 3/10 381/94.1
8,908,889 B2 * 12/2014 Lautzenhiser ......... G08B 29/24 381/315
11,250,827 B2 2/2022 Robotham
2006/0139152 A1 6/2006 Keeler et al.
2009/0096619 A1 4/2009 Felske et al.
2011/0187541 A1 8/2011 Noguchi
2021/0035545 A1 * 2/2021 Robotham ............... G08B 3/10

FOREIGN PATENT DOCUMENTS

JP H09147269 A 6/1997

OTHER PUBLICATIONS

European Examination Report, dated Feb. 19, 2024, issued in priority EP Application No. 23165991.3.
European Search Report, dated Aug. 25, 2023, issued in priority EP Application No. 23165991.3.

* cited by examiner

*Primary Examiner* — Quan Zhen Wang
*Assistant Examiner* — Rajsheed O Black-Childress
(74) *Attorney, Agent, or Firm* — Banner & Witcoff, Ltd.

(57) ABSTRACT

A piezo sounder device 100 comprising a piezo sounder 110 and a controller 120, wherein the controller 120 is configured, upon activation of the piezo sounder device 100, to drive the piezo sounder 110 at: a first frequency substantially corresponding to a resonant frequency of the piezo sounder 110 at a first operational temperature; and a second frequency substantially corresponding to a resonant frequency of the piezo sounder 110 at a second operational temperature. Also disclosed is a method 200 of manufacturing the device 100, and a method 300 of emitting a sound 400, 500.

15 Claims, 6 Drawing Sheets

PIEZOELECTRIC SOUNDER DEVICE

CROSS-REFERENCE TO RELATED APPLICATIONS

This application claims the priority of European Application No. 23165991.3, filed on Mar. 31, 2023, the entire contents of which being fully incorporated herein by reference.

TECHNICAL FIELD

The present disclosure relates to a piezo sounder device and a method of manufacturing the same, and is particularly, although not exclusively, concerned with a piezo sounder device having improved performance over a range of operating temperatures.

BACKGROUND

Sound Pressure Level (SPL) is a measure of sound loudness in the units of decibels (dB). The higher the SPL, the louder the sound is and a lower SPL indicates the sound is quieter.

A piezoelectric sounder device (also piezo sounder device) contains a piezoelectric sounder (also piezo sounder) or buzzer for emitting a sound.

A piezo sounder device may be used as an alarm for emitting an alarm sound upon activation. For example, as a safety mechanism, a firefighter may carry a distress signal unit (DSU) or a personal alert safety system (PASS) having a piezo sounder which emits an alarm when triggered (e.g., if the firefighter has been stationary or otherwise inactive for a pre-determined period of time). Similarly, a firefighter's breathing apparatus may include an alarm having a piezo sounder device for indicating a remaining quantity of air.

Firefighters often work in extreme conditions, which typically include loud sources of sound such as a burning fire, emergency sirens and fire hoses. Further, the temperatures in which firefighters operate range from sub-zero (e.g., outdoors during winter) to hundreds of degrees (e.g., 260° C. during a flashover event), with modal intermediate temperatures being room temperature (e.g., around 20-25° C.), and in the vicinity of a fire (e.g., around 70-90° C.).

In order to ensure a firefighter's safety, it is desirable that a firefighter's DSU, PASS or other safety device be capable of emitting an alarm sound which is readily audible from a large distance in the conditions at the time of activation.

For example, there exist standards for DSUs and other firefighter's alarms which require a minimum sound intensity at various operating temperatures. These standards include BS10999:2010 and NFPA 1982-2018.

STATEMENTS OF INVENTION

BS10999:2010 6.3.2.1 requires a frequency drop of at least 600 Hz from a stabilised upper frequency of 2900 Hz+/−200 Hz, and a return to the stabilised upper frequency. BS10999:2010 6.3.2.2 discourages the inclusion of any additional components of a sound pattern which mask or distract from the required pattern.

NFPA 1982-2018 6.4.3.9 ff. permits the selection of frequencies from within specified ranges, but does not disclose specific values within such ranges or teach any advantages of particular regions of such ranges.

The present inventor has determined that the audibility of a piezo sounder device may be improved by emitting a sound at a frequency which is at or near the peak frequency response of the device in the conditions at the time of activation. As the frequency response, including the resonant frequency, of a piezo sounder varies with temperature, the frequency required to emit a readily audible alarm also varies with temperature. Accordingly, a frequency which produces a readily audible alarm at room temperature may not produce a readily audible alarm at 260° C.

The present inventor has determined that previously proposed devices, which may measure an ambient temperature at the instant of activation and accordingly adjust the driving frequency of the piezoelectric sounder or adjust the dimensions of a sound chamber within the device, may be complex to manufacture (e.g., requiring adjustable sound chambers) and require additional components (e.g., temperature sensors).

It would therefore be desirable to provide a piezoelectric sounder device which is more straightforward to manufacture whilst providing improved audibility across a range of temperatures.

According to an aspect of the present disclosure, there is provided a device. This aspect may form part of and/or be used in conjunction with any other aspect.

The device may comprise a piezo sounder device. The piezo sounder device may comprise a piezo sounder and/or a controller. The controller may be configured, (e.g., upon activation of the device, such as when a criterion is satisfied, such as a non-movement criterion of the device), to drive the piezo sounder at a first frequency (e.g., a first resonant frequency). The first frequency may substantially correspond to a resonant frequency of the piezo sounder at a first operational temperature. For example, the first frequency may be within 50 Hz of the resonant frequency of the piezo sounder at the first operational temperature (e.g., the first frequency may be equal to the resonant frequency of the sounder at the first operational temperature).

An operational temperature may be a temperature of the device at the instant of activation of the sounder. The first operational temperature may be any temperature at which the device is expected to function (e.g., emit a readily audible sound). For example, when the piezo sounder device comprises a firefighter's safety alarm, the first operational temperature may be a minimum temperature at which the safety alarm is required to function.

The controller may be configured to drive the piezo sounder at a second frequency (e.g., a second resonant frequency). The second frequency may substantially correspond to a resonant frequency of the piezo sounder at the second operational temperature. For example, the second frequency may be within 50 Hz of the resonant frequency of the piezo sounder at the second operational temperature (e.g., the second frequency may be equal to the resonant frequency of the sounder at the second operational temperature). The second operational temperature may be a maximum temperature at which a safety alarm is required to function.

According to an aspect of the present disclosure, there is provided a piezo sounder device comprising a piezo sounder and a controller, wherein the controller is configured, upon activation of the piezo sounder device, to drive the piezo sounder at: a first frequency substantially corresponding to a resonant frequency of the piezo sounder at a first operational temperature; and a second frequency substantially corresponding to a resonant frequency of the piezo sounder at a second operational temperature. This aspect may form part of and/or be used in conjunction with any other aspect.

The controller may be configured to drive the piezo sounder in a frequency sweep including at least the first and the second frequencies. For example, the piezo sounder may be driven in a sweep in which the driving frequency is rising or falling continuously and so does not dwell at any particular frequency.

The first operational temperature may be one of −30° C., 23° C., 85° C. and 260° C. The second operational temperature may be another of 30° C., 23° C., 85° C. and 260° C. (e.g., excluding the first operational temperature).

The first operational temperature may be one of −20° C., 22° C., 71° C. and 260° C. The second operational temperature may be another of −20° C., 22° C., 71° C. and 260° C. (e.g., excluding the first operational temperature).

One of the first and the second operational temperatures may be an uppermost expected operating temperature. The other of the first and the second operational temperatures may be a lowermost expected operating temperature. The first and second operational temperatures may thereby span all or part of the operating temperature range of the device. For example, the first operational temperature may comprise −30° C. or −20° C. The second operational temperature may comprise 260° C.

The controller may comprise a microcontroller and a voltage-enhancing drive circuit. The controller may be configured to drive the piezo sounder in the same manner upon every activation, e.g., regardless of an operational temperature of the piezo sounder at the instant of activation.

The controller may be configured to drive the piezo sounder at a third frequency. The third frequency may substantially correspond to a resonant frequency of the piezo sounder at a third operational temperature. The controller may be configured to drive the piezo sounder at a fourth frequency. The fourth frequency may substantially correspond to a resonant frequency of the piezo sounder at a fourth operational temperature. The third and fourth operational temperatures may be provided between the first and second operational temperatures.

The controller may be configured to drive the piezo sounder in a stepped pattern (e.g., such that the piezo sounder dwells at each driving frequency). The piezo sounder may be driven at the first frequency for a first duration. The piezo sounder may be driven at the second frequency for a second duration. The piezo sounder may be driven at the third frequency for a third duration. The piezo sounder may be driven at the fourth frequency for a fourth duration.

The controller may be configured to drive the piezo sounder such that each frequency corresponding to a resonant frequency of the piezo sounder is preceded and/or succeeded (e.g., immediately preceded and/or immediately succeeded) by a frequency which is not (e.g., not substantially) a resonant frequency of the piezo sounder (e.g., not a resonant frequency of the sounder at any temperature). The controller may be configured to drive the sounder such that the resonant frequencies are provided in pairs, adjacent pairs being interleaved by a low tone at a non-resonant frequency. The pairs may be pairs of ascending or descending steps. Adjacent pairs may increase or decrease monotonically. Adjacent pairs may not increase or decrease monotonically.

A non-resonant frequency of the sounder may be any frequency which is not a resonant frequency of the sounder at a temperature at which the device is required to operate (e.g., according to typical operating conditions of the device or according to standards requirements). For example, a non-resonant frequency may be a resonant frequency of the device at an operational temperature substantially lower than a lowermost expected operating temperature, e.g., −100° C.

A non-resonant frequency of the sounder may be any frequency which is not a resonant frequency of the sounder at any temperature (e.g., is lower than all resonant frequencies).

The controller may be configured to drive the piezo sounder such that each frequency corresponding to a resonant frequency is provided temporally adjacent a further frequency corresponding to a resonant frequency.

The controller may be configured to drive the piezo sounder such that each frequency corresponding to a resonant frequency is preceded and succeeded by a frequency which does not correspond (e.g., does not correspond substantially) to a resonant frequency.

The first frequency may be greater in value than the second frequency. The controller may be configured to drive the piezo sounder at the first frequency prior to the second frequency. The second frequency may be greater in value than the third frequency. The controller may be configured to drive the piezo sounder at the second frequency prior to the third frequency. The third frequency may be greater than the fourth frequency. The controller may be configured to drive the piezo sounder at the third frequency prior to the fourth frequency. The resonant frequencies may be provided in decreasing steps.

The second frequency may be greater in value than the first frequency. The controller may be configured to drive the piezo sounder at the first frequency prior to the second frequency. The third frequency may be greater in value than the second frequency. The controller is configured to drive the piezo sounder at the second frequency prior to the third frequency. The resonant frequencies may be provided in increasing steps.

The steps may be of substantially equal duration. Alternatively, the duration of the steps may be weighted in favour of those frequencies substantially corresponding to resonant frequencies at or near room temperature, or any other desired temperature(s).

The steps of the resonant frequencies (e.g., the high tones) may be provided in 100 Hz increments between the first frequency and the second frequency. The steps of the resonant frequencies (e.g., the high tones) may increase or decrease monotonically.

The device may comprise a distress signal unit. The device may comprise a personal alert safety system. The device may not comprise a temperature sensor. The device may not be configured to determine a temperature of the device, e.g., at the instant of activation. The sound chamber of the device may be fixed in dimensions and geometry. The sound chamber may not be configured to change shape or dimensions.

According to an aspect of the present disclosure, there is provided a breathing apparatus comprising a piezo sounder device (e.g., of any of the previous aspects). This aspect may form part of and/or be used in conjunction with any other aspect.

According to an aspect of the present disclosure, there is provided a method of manufacturing a piezo sounder device comprising a piezo sounder and a controller, the method comprising: characterising the piezo sounder at a first operational temperature to determine a first frequency substantially corresponding to a resonant frequency of the piezo sounder at the first operational temperature; configuring the controller to drive the piezo sounder at the first frequency when the device is activated. This aspect may form part of and/or be used in conjunction with any other aspect. The method may additionally comprise configuring the controller to drive the piezo sounder at a second frequency when the device is activated, the second frequency corresponding to a resonant frequency of the piezo sounder at a second operational temperature.

According to an aspect of the present disclosure, there is provided a method of manufacturing a piezo sounder device comprising a piezo sounder and a controller, the method comprising: characterising the piezo sounder at a first operational temperature to determine a first frequency substantially corresponding to a resonant frequency of the piezo sounder at the first operational temperature; configuring the controller to drive the piezo sounder at the first frequency when the device is activated; and configuring the controller to drive the piezo sounder at a second frequency when the device is activated, the second frequency corresponding to a resonant frequency of the piezo sounder at a second operational temperature. This aspect may form part of and/or be used in conjunction with any other aspect.

The method may comprise characterising the piezo sounder at a second operational temperature to determine a second frequency corresponding to a resonant frequency of the piezo sounder at the second operational temperature. The method may comprise calculating the second frequency based on the first frequency.

The method may comprise configuring the controller to drive the piezo sounder at a third resonant frequency when the device is activated. The third resonant frequency may substantially correspond to a third operational temperature. The method may comprise configuring the controller to drive the piezo sounder at a fourth resonant frequency when the device is activated. The fourth resonant frequency may substantially correspond to a fourth operational temperature.

The method may comprise characterising the piezo sounder at a third operational temperature to determine a third frequency corresponding to a resonant frequency of the piezo sounder at the third operational temperature. The method may comprise calculating the third frequency based on the first and/or second frequency.

According to an aspect of the present disclosure, there is provided a method of emitting a sound by a piezo sounder device, the device comprising a piezo sounder and a controller, the method comprising: driving, by the controller, the piezo sounder at a first frequency substantially corresponding to a resonant frequency of the piezo sounder at a first operational temperature; and driving, by the controller, the piezo sounder at a second frequency substantially corresponding to a resonant frequency of the piezo sounder at a second operational temperature. This aspect may form part of and/or be used in conjunction with any other aspect.

The method may not comprise: determining an operational temperature of the piezo sounder at the instant of activation; selecting at the instant of activation the first frequency or the second frequency based on an operational temperature of the piezo sounder at the instant of activation; and/or mechanically adjusting a dimension or geometry of a sound chamber of the piezo sounder device.

The term piezoelectric may be abbreviated to piezo.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF DRAWINGS

For a better understanding of the present invention, and to show more clearly how it may be carried into effect, reference will now be made, by way of example, to the accompanying drawings, in which.

DETAILED DESCRIPTION

Device

Figure 1A:
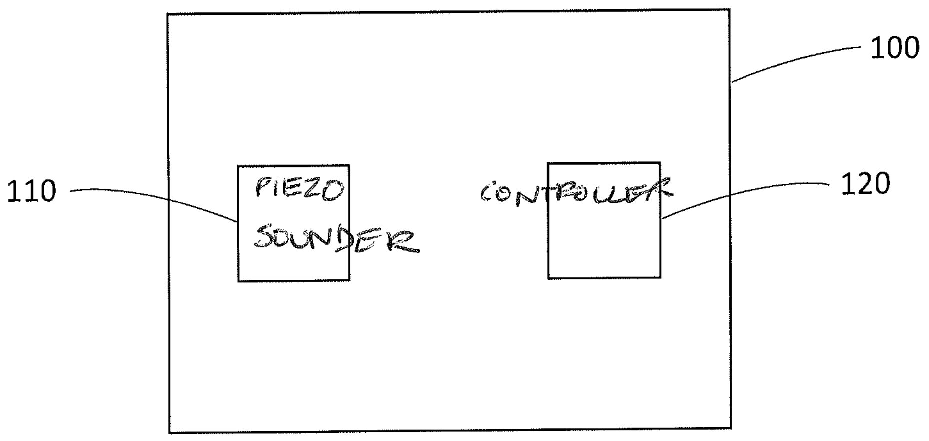
FIG. 1A is a schematic of a piezoelectric sounder device according to the present disclosure.
Figure 1B:
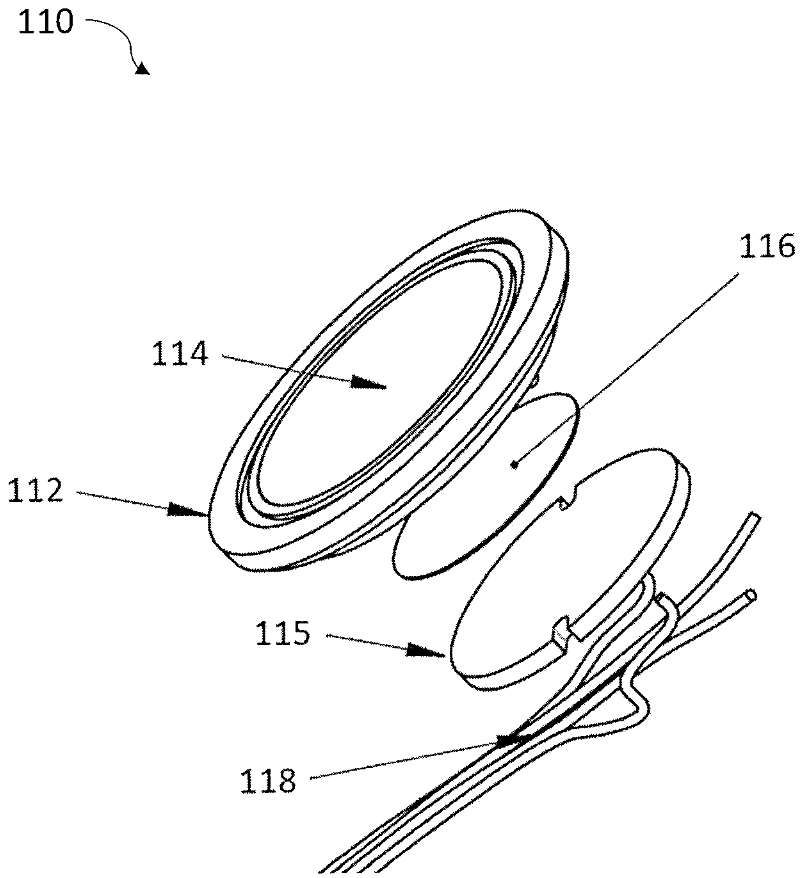
FIG. 1B is an exploded view of a piezoelectric sounder according to the present disclosure.

With reference to FIGS. 1A and 1B, a piezoelectric sounder device 100 (also, a piezo sounder device) according to the present disclosure is described, the piezo sounder device comprises a piezoelectric sounder 110 (also, a piezo sounder), and a controller 120 (not shown in FIG. 1B).

The piezo sounder 110 comprises an outer ring 112, a diaphragm 114 provided within and attached to the outer ring 112, and a thin piezoelectric disc 116 is bonded to the underside of the diaphragm 114. Wires 118 provide electrical communication between the piezoelectric disc 116 and the controller 120. A backing plate 115 is bonded onto the rear of the outer ring.

A sound chamber is coupled to the diaphragm 114 in order to increase the sound pressure level (SPL) of the sounder. The sound chamber may be of fixed dimensions, such that it may not be configured to substantially change shape or dimensions during operation (e.g., other than as caused by sound vibrations).

The controller 120 is configured to drive the piezo sounder 110 so as to emit a sound or sound pattern, such as the sound pattern 400 described later.

The controller 120 may comprise a microcontroller (not shown) for controlling the piezo sounder 110 and a voltage-enhancing drive circuit 130. The voltage-enhancing drive circuit may enhance the signal from the microcontroller, in order to increase the loudness of the emitted sound.

The piezo device 100 may be provided as part of a safety alarm (e.g., a DSU) integrated into part of a firefighter's equipment. Such a safety alarm may additionally comprise a movement sensor, such as an accelerometer or gyroscope, for determining whether the firefighter has been inactive (e.g., stationary) beyond a predetermined duration. If the safety device determines that the firefighter has been inactive beyond a predetermined duration, the controller 120 may drive the piezo sounder 110 to emit a sound as subsequently described. The safety alarm may also be activated by pressing of a button on the equipment.

In use, the controller 120 applies an electrical signal to the piezoelectric disc 116. For example, the microcontroller may apply an electrical signal to the voltage-enhancing circuit which in turn provides the electrical signal to the piezoelectric disc 116. This causes a bending motion in the disc 116 which is transmitted to the larger diaphragm 114, and it is the bending moment of the diaphragm 114 that moves the air within the sound chamber to generate the sound.

Figure 1C:
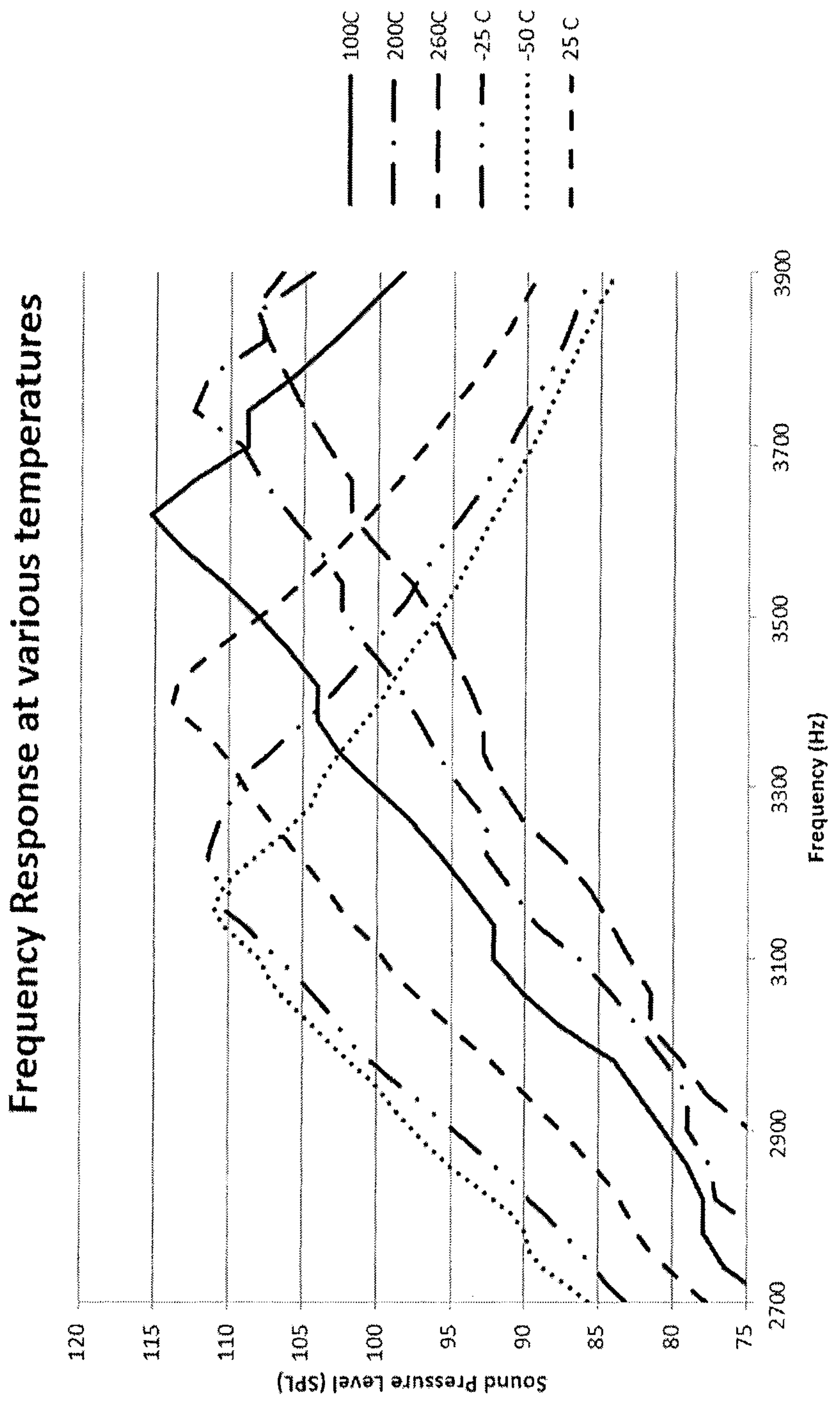
FIG. 1C is a frequency response graph of an example piezoelectric sounder.

When an electrical signal of fixed voltage is applied to the piezo sounder 110 and the frequency is slowly increased, taking momentary sound pressure level (SPL) readings from the sounder for each frequency generates a frequency response graph as shown in FIG. 1C. The frequency response indicates the sounder output SPL for a given frequency, the peak sound output and the frequency at which the peak sound output occurs. As shown in FIG. 1C, the peak frequency response at 260° C. (approx. 3850 Hz) is significantly different from the peak frequency response at −50° C. (approx. 3150 Hz), meaning that driving the piezo sounder 110 at 3850 Hz when the temperature of the piezo sounder 110 is −50° C. would result in an alarm with limited audibility, and vice versa.

It will be noted that the frequency response graph of FIG. 1C is a frequency response graph of an example piezo sounder device which may not be provided according to the present invention. For example, the peak response frequencies at certain temperatures may not correspond to the peak response frequencies of a sounder 110 of the present invention described later.

The frequency response depends on a number of environmental, mechanical and materials factors. The piezo sounder 110, comprises its own resonant frequency which may depend on factors (e.g., including the attachment method of the piezo disc 116 to the diaphragm 114, the attachment of the diaphragm o the outer ring 112, the dimensions of the diaphragm, the dimensions of the piezo disc, the piezo disc and diaphragm material type). The sound chamber geometry also has its own resonant frequency. These factors may be controlled during manufacture of the device 100.

Further, tight control of the manufacturing process, materials and geometries of the components can yield repeatable frequency responses generated by each piezo manufactured. If these controls were not in place, otherwise identical piezo sounders may vary from one another, such that the resonant frequencies of multiple piezo sounders 110 may differ. It may otherwise be necessary to characterise each piezo sounder 110 in order to determine its frequency response characteristics and resonant frequency which may be time consuming and costly.

In addition to the above factors affecting the frequency response of the device 100 is the effect of temperature. Temperature can change the frequency response of the both the piezo sounder and sound chamber. Higher temperatures typically shift the frequency response peak to a higher frequency. Lower temperatures typically shift the frequency response peak to a lower frequency (FIG. 1C). By examining one of the curves in FIG. 1C, it can be observed that a selected frequency of 100 Hz or greater away from the resonant peak, can result in a significant drop in SPL (loudness). As the temperature depends on the environment of the device 100 at the instant of activation, this factor cannot be controlled.

Accordingly, when a piezo sounder device 100 is provided as part of a firefighter's safety alarm, the peak frequency which provides the best response and so the most audible alarm, will depend on the ambient temperature of the device at the instant of activation. Firefighters are exposed to such a wide range of temperatures that the frequency giving the peak frequency response at one operating temperature may not be readily audible or may be significantly reduced at another operating temperature (FIG. 1C).

Method of Manufacture

Figure 2:
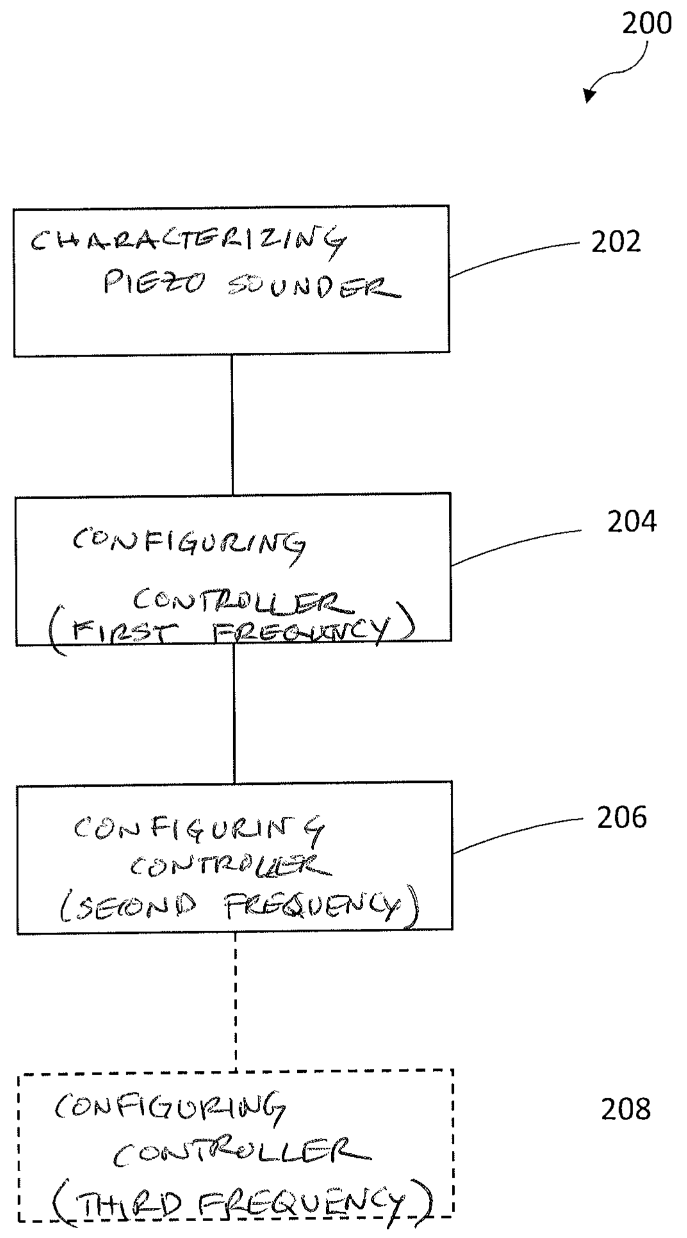
FIG. 2 is a flowchart of a method according to the present disclosure.
Figure 4:
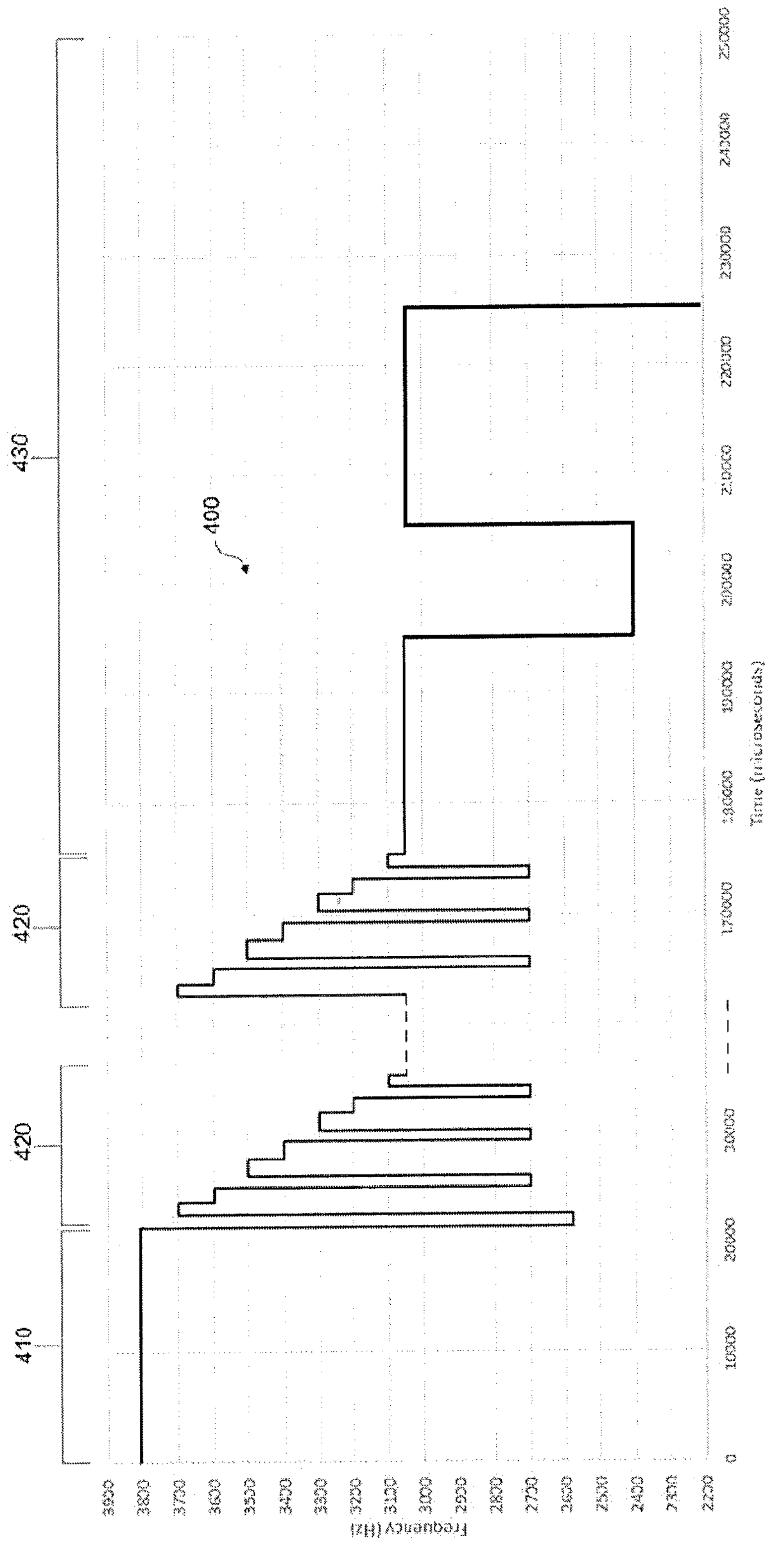
FIG. 4 is an example sound pattern according to the present disclosure.

With reference to FIG. 2, a method 200 of manufacturing a piezo sounder device 100 which better addresses the above variability is described. The method 200 comprises characterising 202 the piezo sounder 110 at a first operational temperature to determine a first frequency corresponding to a resonant frequency of the piezo sounder 110 at the first operational temperature. For example, the piezo sounder 110 may be characterised immediately post-manufacturing at room temperature in order to determine a resonant frequency of the sounder 110 at room temperature. In the example of FIG. 4, the resonant frequency of the sounder 110 at 23° C. may be 3350 Hz.

The method 200 further comprises configuring 204 the controller 120 to drive the piezo sounder 110 at the first frequency when the device 100 is activated.

The method 200 further comprises configuring 206 the controller 120 to drive the piezo sounder 110 at a second frequency when the device 100 is activated, the second frequency corresponding to a resonant frequency of the piezo sounder 110 at a second operational temperature. For example, the piezo sounder 110 may be characterised at a second operational temperature, e.g., by heating or cooling the device 100 to the second operational temperature, in order to determine a resonant frequency of the piezo sounder at the second operational temperature. Alternatively, in order to determine the second frequency corresponding to a resonant frequency of the sounder 110 at a second operational temperature, the second frequency may be calculated based on the first resonant frequency. In the example of FIG. 4, the resonant frequency of the sounder 110 at 85° C. may be 3550 Hz.

The method 200 may further comprise configuring 208 the controller 120 to drive the piezo sounder 110 at a third resonant frequency when the device 100 is activated, the third resonant frequency corresponding to a resonant frequency of the sounder 110 at a third operational temperature. For example, the piezo sounder 110 may be characterised at the third operational temperature, e.g., by heating or cooling the device 100 to the third operational temperature, to determine a third frequency corresponding to a resonant frequency of the piezo sounder 110 at the third operational temperature. Alternatively, in order to determine the third frequency corresponding to a resonant frequency of the sounder 110 at the third operational temperature, the third frequency may be calculated based on the first and/or the second resonant frequency. In the example of FIG. 4, the resonant frequency of the sounder 110 at 260° C. may be 3800 Hz.

The method 200 may further comprise configuring the controller 120 to drive the piezo sounder 110 at a fourth resonant frequency when the device 100 is activated, the fourth resonant frequency corresponding to a resonant frequency of the sounder 110 at a fourth operational temperature. For example, the piezo sounder 110 may be characterised at the fourth operational temperature, e.g., by heating or cooling the device 100 to the fourth operational temperature, to determine a fourth frequency corresponding to a resonant frequency of the piezo sounder 110 at the fourth operational temperature. Alternatively, in order to determine the fourth frequency, the fourth frequency may be calculated based on the first, the second and/or the third resonant frequency. In the example of FIG. 4, the resonant frequency of the sounder 110 at −30° C. may be 3200 Hz.

The resonant frequency at other temperatures of interest can be determined also. For example, depending on the location in which the device 100 will be used, it may be common for a firefighter to operate at a minimum temperature of −50° C. rather than −30° C.

An audible sound pattern can then be carefully constructed, the sound pattern having frequency components comprising at least two resonant frequencies, which correspond to different operating temperatures (determined by the previous characterisation), spanning all or part of the operating temperature range of the device 100. The controller 120 then uses this carefully constructed sound pattern to drive the sounder 110 at multiple resonant frequencies upon every activation, regardless of an operational temperature of the device 100 at the instant of activation. In this way, the sounder 110 will be driven at a frequency which is at or very close to a peak frequency response of the sounder 110 at the instant of activation. This may obviate the requirement to: measure a temperature of the device 100 at the instant of activation; adjust the driving frequency of the controller 120 at the instant of activation based on the measured temperature; and/or adjust the dimensions of the sound chamber at the instant of activation based on the measured temperature. The device 100 may not therefore require a temperature sensor to operate, such that the manufacture and construction of the device 110 may thereby be simplified when compared with previously proposed devices.

By employing this method, a degradation in sounder loudness due to external temperature effects can be minimised. This benefits general sounder performance and also helps to ensure a firefighter's safety, regardless of temperature at the instant of activation.

Method of Emitting a Sound

Figure 3:
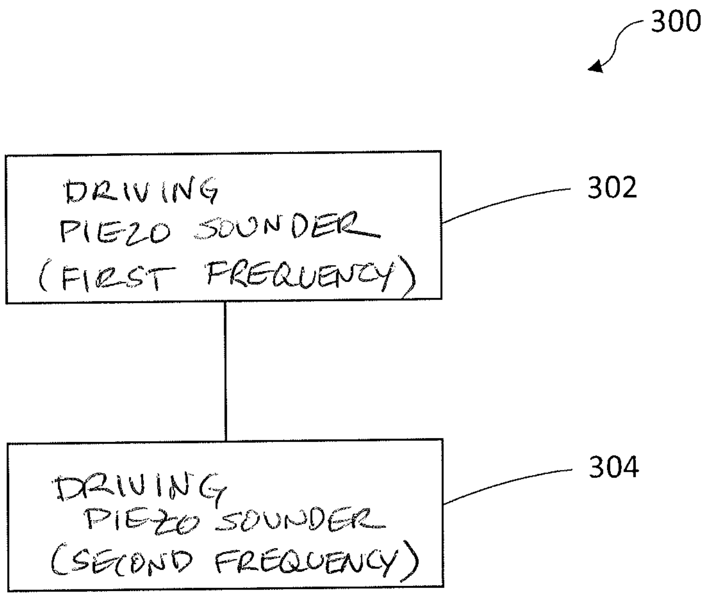
FIG. 3 is a flowchart of a method according to the present disclosure.

With reference to FIG. 3, a method 300 of emitting a sound by a piezo sounder device 100 according to the present disclosure is described.

The method 300 comprises driving 302, by the controller 120, the piezo sounder 110 at a first frequency substantially corresponding to a resonant frequency of the piezo sounder 110 at a first operational temperature. For example, upon every activation, the piezo sounder 110 may be driven at a frequency which corresponds to a resonant frequency of the device at −30° C. A frequency may correspond to a resonant frequency at an operational temperature when it is within 100 Hz of the resonant frequency, or more specifically within 50 Hz of the resonant frequency.

The method 300 further comprises driving 304, by the controller 120, the piezo sounder 110 at a second frequency substantially corresponding to a resonant frequency of the piezo sounder 110 at a second operational temperature. For example, upon every activation, the piezo sounder 110 may be driven at a frequency which corresponds to a resonant frequency of the device at 260° C.

The method 300 may further comprise driving the piezo sounder 110 at a third frequency substantially corresponding to a resonant frequency of the piezo sounder 110 at a third operational temperature and/or driving the piezo sounder 110 at a fourth frequency corresponding substantially to a resonant frequency of the piezo sounder 110 at a fourth operational temperature.

The first and second operational temperatures may be any temperatures at which the device may be intended to operate, and thus any temperatures at which the device is expected to emit a sound according to specified requirements. The first and second operational temperatures may be sufficiently spaced apart that the peak frequency response of the device 100 at the first operational temperature is substantially (e.g., significantly) different from the peak frequency response at the second operational temperature (e.g., such that a driving frequency corresponding to the resonant frequency at the first operational temperature would not satisfy specified requirements at the second operational temperature). Further, an operational temperature may not include a temperature which is so high as to cause the device to disintegrate or otherwise malfunction.

In the context of a safety device for a firefighter, a piezo sounder device 100 may be expected to provide a readily audible alarm at a range of temperatures spanning −30° C. through 260° C. In one example, the first and second operational temperatures may be opposite ends of a range of temperatures through which the device is required to function according to specified requirements. Accordingly, the first operational temperature may comprise one of −30° C. and 260° C., and the second operational temperature may comprise the other of −30° C. and 260° C. The third and fourth operational temperatures may comprise 23° C. and 85° C., which may be at or near other modal operating temperatures for the device.

The device 100 may thereby be operated in the same manner upon every activation. For example, the method 300 may not comprise determining a temperature of the device 100 at the instant of activation. Accordingly, the method 300 may not comprise adjusting the dimensions of the sound chamber depending on a determined temperature or adjusting a driving frequency of the controller 120 depending on a determined temperature.

The method 300 thereby represents a simplified method of operating a piezo sounder device 100.

Sound Pattern

FIG. 4 is an example driving pattern 400 of the controller 120 when driving the disc 116. The pattern 400 has been determined for a device 100 which is expected to function at a range of operational temperatures spanning −30 to 260° C. The sound pattern 400 may be particularly beneficial for use in a DSU in the UK or Europe.

The pattern 400 may be emitted by a device 100 which has been manufactured according to the method 200 above, and thus a device 100 having a controller 120 configured to perform the method 300 above.

Accordingly, it may have been determined by method 400 that a peak frequency response: at −30° C. is 3200 Hz; at 23° C. is 3300 Hz; at 85° C. is 3500 Hz; and at 260° C. is 3800 Hz. The pattern 400 therefore comprises of a tone at each of the above frequencies.

The pattern 400 comprises a first portion 410, a second portion 420, and a third portion 430 provided consecutively according to Table 1.

The pattern 400 generally comprises two types of tones-high tones and low tones. The high tones target resonant frequencies of the device, whilst the low tones target non-resonant frequencies of the device (e.g., tones which are not resonant frequencies of the device at any temperature). The low tones are below the range of resonant frequencies of the device.

The first portion 410 comprises a continuous high tone at 3806 Hz for a duration of 21450 microseconds. The first portion 210 thus corresponds to 3800 Hz which is where the resonant peak moves at extremely high temperatures (e.g., 260° C.). Portion 410 may be repeated multiple times in a "Full Alarm" alert.

The second portion 420 comprises a series of steps including high tones and low tones. In particular, the second portion 420 comprises pairs of descending high tone steps, consecutive pairs being interleaved by a step at a low tone. The duration of each step varies according to Table 1. Portion 420 may be repeated multiple times in a "Full Alarm" alert. In the example sound pattern 400, portion 420 is repeated 12 times.

The higher tones span 3800 to 3100 Hz in 100 Hz increments, such that the resonant frequency of the device 100 at any temperature between the maximum and minimum expected operating temperatures (260° C. to −30° C.) is covered, within a tolerance of 50 Hz. The range of frequencies covered by the high tones may therefore be defined according to the maximum and minimum expected operating temperatures, the steps then being defined by dividing this range into sufficiently small (e.g., 100 Hz) increments. Accordingly, when the sound pattern 400 is emitted by the device 100, a sound at or near the resonant frequency of the device will be emitted regardless of the temperature at the time of operation. For example, the resonant frequencies of the sounder 110 at −30° C., 23° C., 85° C. and 260° C. are all provided in the sound pattern 400 (within a tolerance of 100 Hz or, more specifically, 50 Hz). In this manner, the sound pattern 400 and/or other characteristics of the device 100 affecting resonant frequency and peak frequency response (e.g., sound chamber dimensions) need not be adjusted according to the operational temperature.

The low frequency tones, spanning 2577 to 2700 Hz are sufficiently low that they are not resonant frequencies of the sounder 110, e.g., regardless of the operational temperature. The low tones prevent sounder 110 from dwelling on resonance, which is more sympathetic to the piezo disc 116 mechanically and so benefits the life of the piezo disc 116. Further, the low tone steps reduce power consumption of the device 100 (e.g., by using less current) when the driving frequency is not near resonance.

It will be noted that the steps of the second portion 420 are not even in duration. In particular, the steps are weighted so as to have slightly more time at the 3300-3500 Hz range as this operating temperature range is where the device will spend most of its operational life rather than at the extremes.

TABLE 1

| Sound Pattern 400 | | |
|---|---|---|
| Duration (microseconds) | Tone frequency (Hz) | Portion |
| 21450 | 3806 | First portion 410 |
| 1250 | 2577 | Second portion 420 |
| 1100 | 3700 | |
| 1350 | 3600 | |
| 1000 | 2700 | |
| 1600 | 3500 | |
| 1600 | 3400 | |
| 1000 | 2700 | |
| 1600 | 3300 | |
| 1350 | 3200 | |
| 1000 | 2700 | |
| 1100 | 3100 | |
| 20000 | 3050 | Third portion 430 |
| 10000 | 2400 | |
| 20000 | 3050 | |

The third portion 430 comprises a continuous tone at 3050 Hz, followed by a second tone at a frequency at least 600 Hz below (specifically 650 Hz), followed again by a continuous tone at 3050 Hz.

After completion of the third portion 430, the sound pattern 400 may be repeated continuously, optionally with a short period of silence between repetitions.

Although the second portion 420 is shown comprising high tones provided in pairs of descending steps, it will be understood that the high tones could alternatively be provided in pairs of ascending steps. For example, the pattern 400 could be emitted in reverse.

Additionally or alternatively, the high tones need not be provided monotonically decreasing, but instead could be provided in a more scattered approach (e.g., 3700 Hz, 3600 Hz; 3100 Hz, 3200 Hz; 3400 Hz, 3300 Hz; 3500H) or may jump back and forth between particular high tones.

Further, the high tones need not necessarily be provided in pairs, but could instead alternate with low tones. Similarly, the sound pattern 400 could be considered to comprise pairs of descending steps, each pair of descending steps being interleaved by a low tone, rather than adjacent pairs of steps being interleaved by a low tone.

Further, the second portion 420 could alternatively comprise a frequency sweep from 3200 to 3800 Hz in which the driving frequency is rising or falling continuously and so does not dwell at any particular frequency.

In relation to the low tones, the first low tone has a frequency of 2577 Hz, and the others have a frequency of 2700 Hz. It will be understood that these frequencies are examples only, and that the skilled person is able to determine a low tone frequency which is outside (e.g., below) the range of resonant frequencies of the device 100 at all temperatures. For example, all low tones could have the same value (2577 Hz or 2700 Hz), or at least some low tones could have different values.

The sound pattern 400 of FIG. 4 therefore represents a specific example of a general inventive concept. The range of high tones may span a resonant frequency at a lowermost expected operating temperature and a resonant frequency at an uppermost expected operating temperature, in sufficiently small increments therebetween (e.g., 100 Hz) that the resonant frequency at any operational temperature between the uppermost and lowermost expected operating temperatures is proximate (e.g., no more than 100 Hz, or more specifically, 50 Hz from) an emitted tone.

It will be understood by the skilled person that, although very similar (if not identical), the frequencies of the sound actually emitted by the device 100 may differ slightly from the driving frequencies of the pattern 400 due to the effects of the sound chamber and other components of the sounder 110.

Alternative Sound Pattern

Table 2 shows an alternative sound pattern 500 according to the present disclosure. In the same manner as sound pattern 400, sound pattern 500 comprises a plurality of tones each at a frequency which corresponds to a resonant frequency of the piezo sounder 110 at a different operational temperature.

The sound pattern 500 comprises 14 portions 501-514 which are provided consecutively. The device 100 may be configured to repeat the sound pattern 500 immediately once portion 14 has been completed.

TABLE 2

| Sound pattern 500 | | | |
|---|---|---|---|
| Portion | Duration | Tone frequency (Hz) | Steps |
| 501 | 1 s +/− 50 ms | 3141 to 3754 | A minimum of 100 frequency-increasing steps |
| 502 | 300 ms +/− 100 ms | 0 | 0 |
| 503 | 250 ms +/− 12.5 ms | 3121 to 3701 Hz | A minimum of 25 frequency-increasing steps |
| 504 | 10 ms +/− 5 ms | 0 | 0 |
| 505 | 250 ms +/− 12.5 ms | 3121 to 3701 Hz | A minimum of 25 frequency-increasing steps |
| 506 | 10 ms +/− 5 ms | 0 | 0 |
| 507 | 250 ms +/− 12.5 ms | 3121 to 3701 Hz | A minimum of 25 frequency-increasing steps |
| 508 | 10 ms +/− 5 ms | 0 | 0 |

TABLE 2-continued

| Sound pattern 500 | | | |
|---|---|---|---|
| Portion | Duration | Tone frequency (Hz) | Steps |
| 509 | 250 ms +/− 12.5 ms | 3121 to 3701 Hz | A minimum of 25 frequency-increasing steps |
| 510 | 300 ms +/− 100 ms | 0 | 0 |
| 511 | 400 ms +/− 20 ms | Alternates between 3600 Hz and 3780 Hz every 10 ms +/− 5 ms | |
| 512 | 200 ms +/− 10 ms | Alternates between 3300 Hz and 3600 Hz every 10 ms +/− 5 ms | |
| 513 | 400 ms +/− 20 ms | Alternates between 3600 Hz and 3780 Hz every 10 ms +/− 5 ms | |
| 514 | 600 ms +/− 100 ms | 0 | 0 |

The values and ranges of tone frequencies in each of portions 501, 503, 507, 509, 511-513 may be selected from a larger range in order to ensure that resonant frequencies of the device 100 at specific operational temperatures are met. For example, the specific frequency values and ranges may have been selected such that frequencies at and/or near the resonant frequencies at operational temperatures of −20° C., 22° C., 71° C., and 260° C. are emitted upon every activation.

The steps of each portion 501, 503, 505, 507, 509 may be equal in both duration and frequency increment, or alternatively may be weighted. By way of example, portion 501 comprises a minimum of 100 frequency-increasing steps starting at 3141 Hz and reaching 3754 Hz. Each step may be substantially equal in increment, e.g., comprising an increase of approximately 6 Hz. Alternatively, the steps may be smaller proximate the resonant frequencies corresponding to −20° C., 22° C., 71° C. and 260° C., so that the sound pattern is weighted towards these frequencies.

Similarly, the duration of each step may be equal (e.g., 0.01 s per step), or alternatively may be weighted (e.g., of greater duration) towards resonant frequencies corresponding to −20° C., 22° C., 71° C. and 260° C.

The sound pattern 500 may be particularly beneficial for use in a DSU in the US. For example, tone frequencies and ranges may be specifically selected to spend as much time at or around the resonant frequencies at those extreme or modal temperatures in the destination location (e.g., it may be desirable that a DSU in the US provide a minimum sound intensity level at −20° C., 22° C., 71° C. and 260° C.).

Although the sound patterns 400, 500 have been described in relation to a DSU having particular characteristics (e.g., frequency response), and requiring minimum sound intensity levels at certain modal or key temperatures, the skilled person will be able to apply the general inventive concept to other devices of different characteristics and requiring minimum sound intensity levels at different specified temperatures. For example, the skilled person will be able to determine the frequency response of an alternative device across a range of operating temperatures and configure the device to be driven at frequencies corresponding to at least two resonant frequencies at respective operating temperatures upon every activation.

Similarly, although the above example sound patterns 400, 500 may comprise more than two resonant frequencies, it will be understood that the technical advantages of the present invention are provided when there are just two resonant frequencies in the sound pattern (e.g., the two resonant frequencies corresponding to the temperature extremes, as these temperatures will have the largest difference between peak frequency response values).

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A piezo sounder device comprising a piezo sounder and a controller, wherein the controller is configured, upon activation of the piezo sounder device, to drive the piezo sounder at:
- a first frequency for a first duration, the first frequency substantially corresponding to a resonant frequency of the piezo sounder at a first operational temperature; and
- a second frequency for a second duration, the second frequency substantially corresponding to a resonant frequency of the piezo sounder at a second operational temperature, wherein the first duration is different from the second duration.

2. The piezo sounder device of claim 1, wherein the controller is configured to drive the piezo sounder in a frequency sweep including at least the first and the second frequencies, optionally wherein one of the first and the second operational temperatures is an uppermost expected operating temperature and the other of the first and the second operational temperatures is a lowermost expected operating temperature.

3. The piezo sounder device of claim 1, wherein the controller is configured to drive the piezo sounder in the same manner upon every activation, regardless of an operational temperature of the piezo sounder at the instant of activation.

4. The piezo sounder device of claim 1, wherein the controller is configured to drive the piezo sounder at a third frequency corresponding to a resonant frequency of the piezo sounder at a third operational temperature.

5. The piezo sounder device of claim 4, wherein the controller is configured to drive the piezo sounder in a stepped pattern, such that the piezo sounder is driven at the first frequency for the first duration, at the second frequency for the second duration, and at the third frequency for a third duration.

6. The piezo sounder device of claim 1, wherein the controller is configured to drive the piezo sounder such that each frequency corresponding to a resonant frequency of the piezo sounder is preceded and/or succeeded by a frequency which is not a resonant frequency of the piezo sounder.

7. The piezo sounder device of claim 6, wherein the controller is configured to drive the piezo sounder such that:
- each frequency corresponding to a resonant frequency is provided temporally adjacent a further frequency corresponding to a resonant frequency; or
- each frequency corresponding to a resonant frequency is preceded and succeeded by a frequency which does not correspond to a resonant frequency.

8. The piezo sounder device of claim 1, wherein the first frequency is greater in value than the second frequency, the controller being configured to drive the piezo sounder at the first frequency prior to the second frequency, optionally wherein the second frequency is greater in value than a third frequency and the controller is configured to drive the piezo sounder at the second frequency prior to the third frequency.

9. The piezo sounder device of claim 1, wherein the second frequency is greater in value than the first frequency, the controller being configured to drive the piezo sounder at the first frequency prior to the second frequency, optionally wherein a third frequency is greater in value than the second frequency and the controller is configured to drive the piezo sounder at the second frequency prior to the third frequency.

10. A breathing apparatus comprising a piezo sounder device, the piezo sounder device comprising a piezo sounder and a controller, wherein the controller is configured, upon activation of the piezo sounder device, to drive the piezo sounder at:

a first frequency for a first duration, the first frequency substantially corresponding to a resonant frequency of the piezo sounder at a first operation temperature; and a second frequency for a second duration, the second frequency substantially corresponding to a resonant frequency of the piezo sounder at a second operational temperature, wherein the first duration is different from the second duration.

11. A method of manufacturing a piezo sounder device comprising a piezo sounder and a controller, the method comprising:

characterising the piezo sounder at a first operational temperature to determine a first frequency substantially corresponding to a resonant frequency of the piezo sounder at the first operational temperature;

configuring the controller to drive the piezo sounder at the first frequency for a first duration when the piezo sounder device is activated; and configuring the controller to drive the piezo sounder at a second frequency for a second duration when the piezo sounder device is activated, the second frequency substantially corresponding to a resonant frequency of the piezo sounder at a second operational temperature, wherein the first duration is different from the second duration.

12. The method of claim 11, further comprising configuring the controller to drive the piezo sounder at a third frequency when the piezo sounder device is activated, the third frequency substantially corresponding to a resonant frequency of the sounder at a third operational temperature.

13. The method of claim 11, further comprising:

characterising the piezo sounder at a second operational temperature to determine the second frequency corresponding to the resonant frequency of the piezo sounder at the second operational temperature; and optionally characterising the piezo sounder at a third operational temperature to determine a third frequency corresponding to a resonant frequency of the piezo sounder at the third operational temperature.

14. A method of emitting a sound by a piezo sounder device, the piezo sounder device comprising a piezo sounder and a controller, the method comprising:

driving, by the controller, the piezo sounder at a first frequency for a first duration, the first frequency substantially corresponding to a resonant frequency of the piezo sounder at a first operational temperature; and driving, by the controller, the piezo sounder at a second frequency for a second duration, the second frequency substantially corresponding to a resonant frequency of the piezo sounder at a second operational temperature, wherein the first duration is different from the second duration.

15. The method of claim 14, wherein the method does not comprise:

determining an operational temperature of the piezo sounder at the instant of activation;

selecting the first frequency or the second frequency based on an operational temperature of the piezo sounder at the instant of activation; and/or mechanically adjusting a dimension of a sound chamber of the piezo sounder device.

* * * * *